(12) United States Patent
Greenwood et al.

(10) Patent No.: US 7,175,233 B2
(45) Date of Patent: Feb. 13, 2007

(54) COMBINATION SLING SEAT AND WAIST BELT ASSEMBLY FOR USE IN GUN TURRET ON MILITARY VEHICLE

(76) Inventors: Kyle L. Greenwood, 300 Hensel Ave., Bryan, TX (US) 77801; William J. Hartmann, 1702 Westmeadow Dr., Houston, TX (US) 77084

( * ) Notice: Subject to any disclaimer, the term of this patent is extended or adjusted under 35 U.S.C. 154(b) by 0 days.

(21) Appl. No.: 11/195,411

(22) Filed: Aug. 2, 2005

(65) Prior Publication Data

US 2006/0113132 A1  Jun. 1, 2006

Related U.S. Application Data

(63) Continuation-in-part of application No. 11/068,693, filed on Feb. 28, 2005.

(60) Provisional application No. 60/631,402, filed on Nov. 29, 2004.

(51) Int. Cl.
*A63G 9/12* (2006.01)
(52) U.S. Cl. ..................... 297/273; 297/485
(58) Field of Classification Search ............ 297/273, 297/485, 484, 467; 472/118, 119, 133
See application file for complete search history.

(56) References Cited

U.S. PATENT DOCUMENTS 5,010,850 A * 4/1991 Sailer ..................... 297/129
5,533,934 A * 7/1996 Miller ..................... 472/118
5,839,965 A * 11/1998 Mullins .................. 472/118
6,142,567 A * 11/2000 Bentley .................. 297/273
D439,062 S * 3/2001 McGinnis et al. .......... D6/347

* cited by examiner

*Primary Examiner*—J. Allen Shriver
(74) *Attorney, Agent, or Firm*—The Matthews Firm

(57) ABSTRACT

A sling leather seat, seven inches wide, and approximately 29–30 inches long, having first and second end pieces and a center segment upon which a turret gunner can be seated, has a first ring between the first end piece and the middle segment, and a second ring between the second end piece and the middle segment. A leather waist belt is connected to the sling seat by a pair of elongated tethers connected between the first and second rings and the waist belt, respectively, including chains, cables and/or straps as the tethers which are of a length to allow the gunner to stand up, off the sling seat, but which will prevent the gunner from being ejected from the gun turret in the event of a vehicle rollover. The first and second end pieces of the sling seat are connected to a pair of rings, respectively, on the interior of the gun turret. The body belt in the preferred embodiment is tethered to the sling seat. In an alternative embodiment, the body belt can be tethered to a third ring anchored at or near the gunner's feet inside the turret.

4 Claims, 9 Drawing Sheets

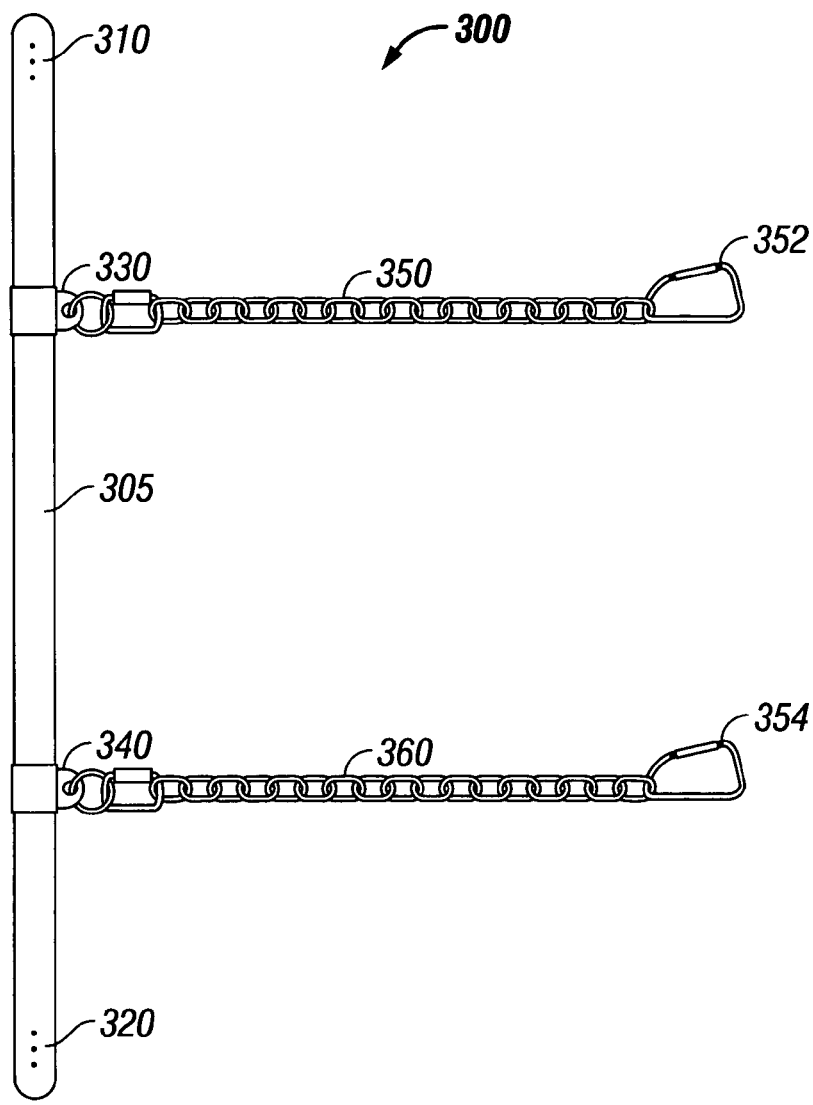
FIG. 5
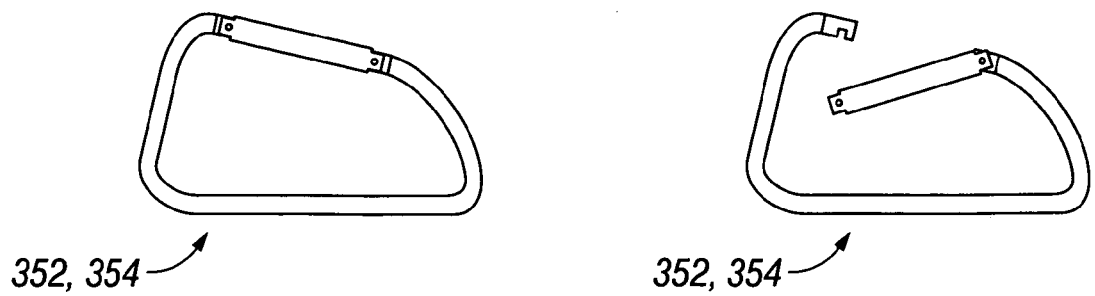
FIG. 6      FIG. 7

COMBINATION SLING SEAT AND WAIST BELT ASSEMBLY FOR USE IN GUN TURRET ON MILITARY VEHICLE

RELATED APPLICATION

This application is a continuation in part and claims priority from U.S. patent application Ser. No. 11/068,693, filed Feb. 28, 2005, which claims priority from Provisional Patent Application Ser. No. 60/631,402, filed Nov. 29, 2004, for COMBINATION SLING SEAT AND WAIST BELT FOR USE IN GUN TURRET ON HUMVEE VEHICLE.

FIELD OF THE INVENTION

The United States military, including soldiers and marines, presently have approximately 20,000 Humvees operating in Iraq and Afghanistan. "Humvee" is slang for the military's all-terrain vehicle, and is a registered Trademark of AM General, LLC.

When the war started in Iraq in March of 2003, very few of the Humvees had any armor, slightly more than 1%. To cut down on casualties and injuries, the military has improved, and continues to improve the armor on the Humvees. The improvement in armor includes heavier and stronger doors, bulletproof windshields for the sides, roof and rear of the vehicle. The door windows can now be opened and swivelled to allow the soldiers inside to fire their weapons.

Many of the Humvees now in use have a revolving gun turret on the top of the vehicle, manned by a single turret gunner. A turret-mounted machine gun is swung around as the gunner rotates the turret. The military is currently adding additional armor around the turret to completely shield the gunner, because the early models typically had armor only on the front of the turret.

The early models of the Humvee having a turret gun required the gunner to manually rotate the turret, but improvements are being added to allow easier rotation of the turrets, including the addition of gear boxes which allow the gunner to turn the turret with one hand, while pointing and shooting with the other.

However, even with the additional armor being all around the Humvee to better protect the turret gunner and the other crewmen, another pair of problems persists, involving the comfort and safety of the turret gunner, the problems and solutions according to the invention being described herein below.

In addition to the Humvee vehicles, other military vehicles have rotating gun turrets which are essentially equivalent to the gun turrets used on the Humvee turrets and have essentially identical internal diameters, for example, 29–30 inches. These other military vehicles include, but are not limited to the Heavy Expanded Mobility Tactical Truck ("HEMTT"), manufactured by or on behalf of the Oshkosh Truck Company. The HEMTT line of trucks includes models M977 (Cargo), M978 (Fuel), M984 (Wrecker), and M985 (Cargo).

The other military vehicles also include the LMTV/FMTV/MTV series support trucks, as well as the M-809 5-Ton Truck, as well as the M939 5-Ton Truck, developed by AM General, LLC, and its related companies.

Other such military vehicles also include tanks used by the United States Army and the Marine Corps, including the original M1 Abrams MBT Tank manufactured by the General Dynamics Land Systems Division of USA, as well as the follow up M1A1 and M1A2 tanks, have a rotating gun turret in which the combination sling seat and waist belt assembly of the present invention can be used.

The gun turrets of many of such other military vehicles are essentially equivalent to the rotating gun turrets used on the Humvee vehicles, including the types of seats used in the turrets, and the dimensions for attaching the sling seats and waist belts are contemplated by the present invention. Thus, with little or no further modifications, the present invention is used within the gun turrets of these other military vehicles.

BRIEF DESCRIPTION OF THE DRAWINGS

FIG. 5 illustrates a top plan view of a waist belt according to the present invention used in cooperation with the improved seat assembly illustrated in FIG. 4;

FIGS. 6 and 7 illustrate a conventional spring-loaded quick disconnect device;

DETAILED DESCRIPTION OF PREFERRED EMBODIMENTS

Figure 1:
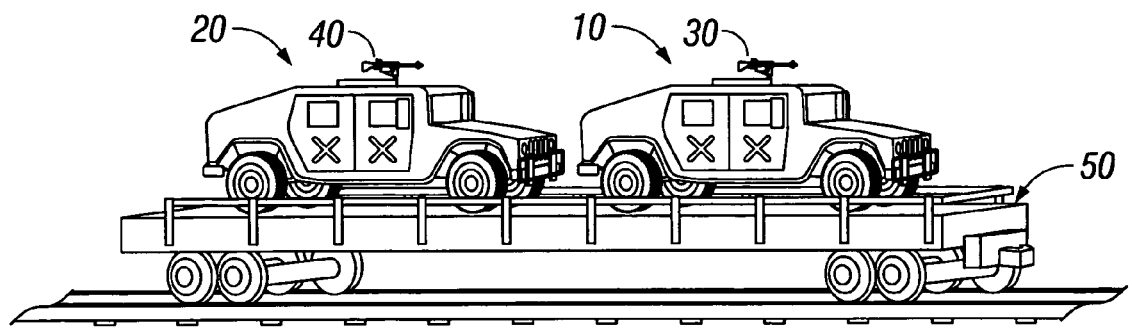
FIG. 1 illustrates a side, pictural view of a pair of Humvees resting on a U.S. Army flat railway car, each Humvee having a turret-mounted machine gun.

Referring now to the drawings in more detail, FIG. 1 illustrates a pair of Humvee vehicles 10 and 20 resting on a U.S. Army flat railway car 50. The vehicle 10 illustrates a turret-mounted machine gun 30, and the vehicle 20 also has a turret-mounted machine gun 40.

Figure 2:
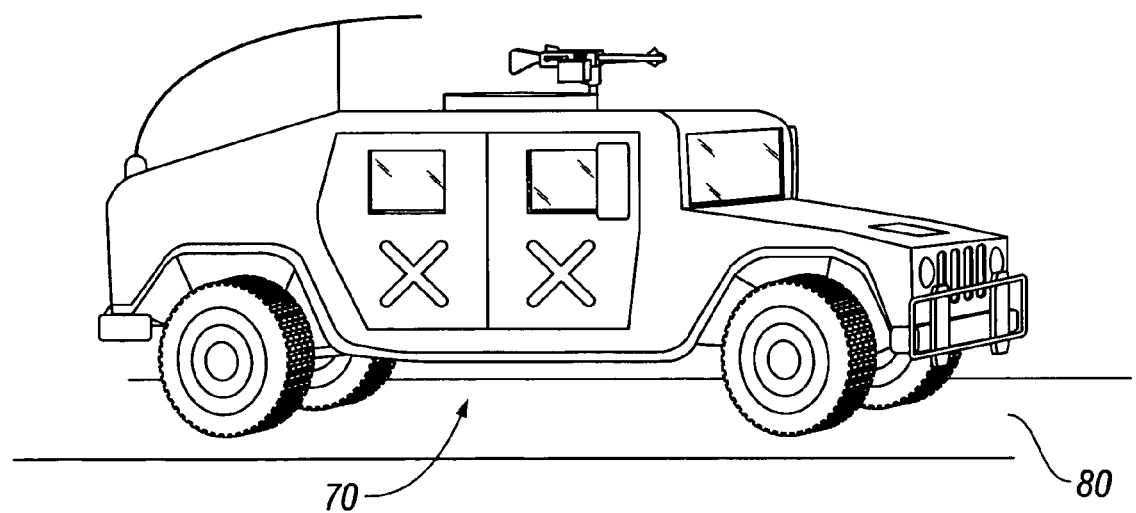
FIG. 2 illustrates a pictural view of another Humvee.

FIG. 2 illustrates another Humvee 70 having it's four wheels resting on, or moving along the road or earthen surface 80.

Figure 3:
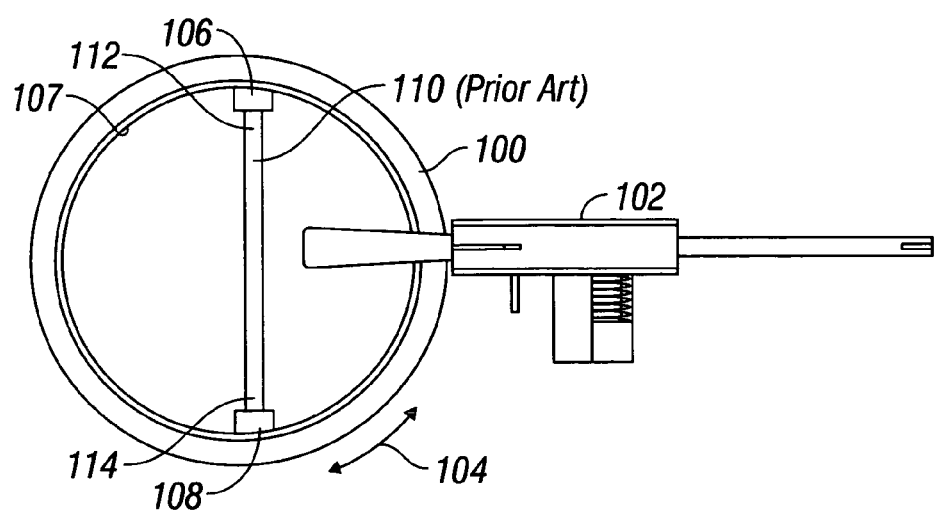
FIG. 3 illustrates, diagrammatically, a top plan view of the interior of a prior art seat used within the interior of a Humvee gun turret upon which the gunner can be seated.

FIG. 3 illustrates, diagrammatically, a turret ring 100 which is configured to protrude at its upper end slightly above the upper surface of the Humvee such as the Humvee 10 or the Humvee 20 illustrated in FIG. 1. A machine gun 102, for example, a 50 caliber gun, is mounted on or near the upper end of the turret ring 100.

In operation, as the turret is rotated in either direction as shown by the arrow 104, the machine gun 102, being integrally mounted to the turret ring 100, also rotates, allowing the gunner to shoot in various directions, from either a sitting position or a standing position.

A pair of rings 106 and 108 are mounted on essentially opposite sides of the internal surface 107 of the turret ring 100. As the turret ring 100 rotates, the rings 106 and 108 rotate with the turret ring 100. The internal diameter of the ring 100 is approximately 29 inches. A prior art nylon belt 110 is connected at or near its two ends 112 and 114 to the rings 106 and 108, respectively. The belt 110 has a conventional quick disconnect device (not illustrated) at each of its ends 112 and 114 for connection to the rings 106 and 108. The belt 110 is only 2 inches wide and can provide a quite uncomfortable seat for the turret gunner. A routine patrol can extend for 5–6 hours. The soldiers and/or marines are said to oftentimes stand-up in the turret because of the discomfort of sitting on a two inch belt. When standing up, they are thus exposed to enemy fire.

Although the invention contemplates the attachment of the leather straps 220 and 230 to the same rings 106 and 108, respectively, as used with the prior art nylon strap 110, the rings 106 and 108 can be replaced by substitute rings, if desired, by removing a single bolt for each of the rings 106 and 108, and making the substitution of such other rings.

Figure 4:
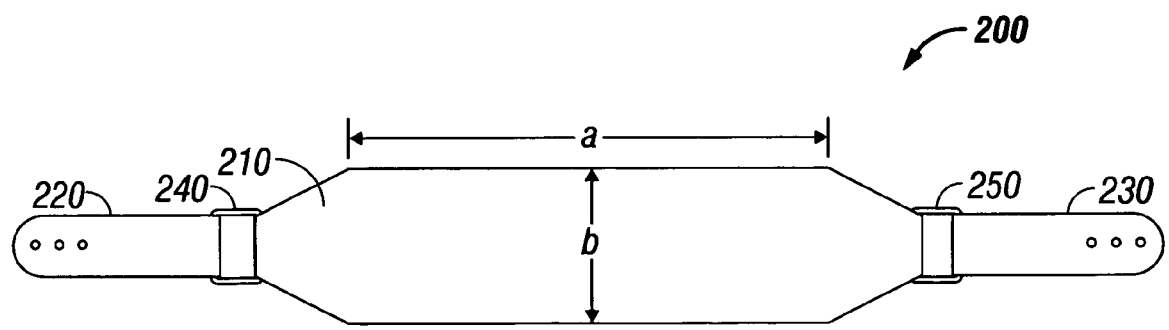
FIG. 4 illustrates a top plan view of an improved seat assembly according to the present invention to replace the prior art seat illustrated in FIG. 3.

FIG. 4 illustrates a seat 200 according to the invention upon which a turret gunner can be seated comfortably. The seat 200 has a center portion 210 which has a length "a" which preferably is 20 inches long and a width "b" which preferably is 7 inches wide. The center portion 210, having the dimensions "a" and "b", has a thickness of 3/8 inches, which is preferably formed from two strips of 3/16 inch leather stitched together. The top side of the seat 200 is rough leather, so as not to be too slick, while the bottom side of the seat is finished, oiled leather. By having the rough leather on the top side, the gunner will tend not to slide on the seat while seated.

The seat 200 has two end straps 220 and 230 which are fabricated from one thickness of 3/16 inch thick leather, and are each approximately 2 inches wide, but can be as wide as 2½ inches. A ring 240 is embedded within the strap 220 and within the center portion 210. A ring 250 is embedded within the end strap 230 and within the center portion 210. Because the end straps 220 and 230 are only 2 to 2½ inches wide, they can be easily connected using conventional quick disconnectors, such as shown in FIGS. 6 and 7, into the rings 106 and 108 in the turret ring 100 illustrated in FIG. 3 to replace the 2 inch nylon strap 110. Other conventional connectors, such as belt buckles and automobile seatbelt connectors, can also be used to connect the strap ends 220 and 230 to the rings 106 and 108, illustrated respectively, in FIG. 3. Also, because of being some 2–2½ inches wide, the ends 220 and 230 can first be threaded through the rings 106 and 108, and then strapped down securely.

As an additional feature of the invention, the lower side of the seat 200 can be lined with KEVLAR[1] to further protect the hindside of the gunner from explosion entering from the underside of the Humvee. This additional protection would be of little, if any value when lining the underside of the prior art, 2 inch wide nylon strip 110.

[1] KEVLAR is a registered Trademark of E. I. du Pont de Nemours and Company

Referring now to FIG. 5, there is illustrated a waist belt 300 according to the present invention. The waist belt 300 is fabricated from a leather band 305, approximately 1½ to 2 inches wide, and is long enough to fit around the turret gunner's waist, for example, 30–50 inches, as needed. A conventional belt buckle, such as the buckle 412 illustrated in FIG. 8, can be connected to either end 310 or 320, and the holes 301 punched at the non-buckled end can be used to cinch up the belt 300 around the gunner's waist.

A pair of rings 330 and 340 are embedded within the belt 300, intermediate ends 310 and 320. A metal chain 350 has one of its ends connected to the ring 330. A second metal chain 360 has one of its ends connected to the ring 340.

In use, a quick disconnect device 352 such as the spring-loaded device 370 illustrated in FIGS. 6 and 7, is connected between the second end of the chain 350 and the ring 240 of FIG. 4. In a similar fashion, such a quick disconnect device 354 is connected between the second end of the chain 360 and the ring 250 of FIG. 4.

The chains 350 and 360 each have selected lengths, such that the gunner may sit on the seat 200, or twist his body, or can stand up and still maintain the connection between the seat 200 and the belt 300. Because of these features, the turret gunner will not be ejected from the turret in the event the Humvee flips over, thus eliminating a major cause of death or injury existing in the present war with Iraq and Afghanistan.

It should be appreciated that in the event that the gunner becomes aware of an imminent catastrophe, such as an explosion from a roadside bomb, a land mine, or there is about to be a wreck with another vehicle, or that the vehicle is about to flip over, the gunner knows to slide his legs forward, while sliding off the front edge of the seat 200. This is known as the emergency rollover position and is intended to prevent the gunner's head from extending above the turret, which would most likely cause his death. However, the waist belt 300 in accordance with the present invention, being attached to the seat 200, which is itself attached to the two rings 106 and 108, will prevent the gunner from being ejected upon such a rollover.

Figure 8:
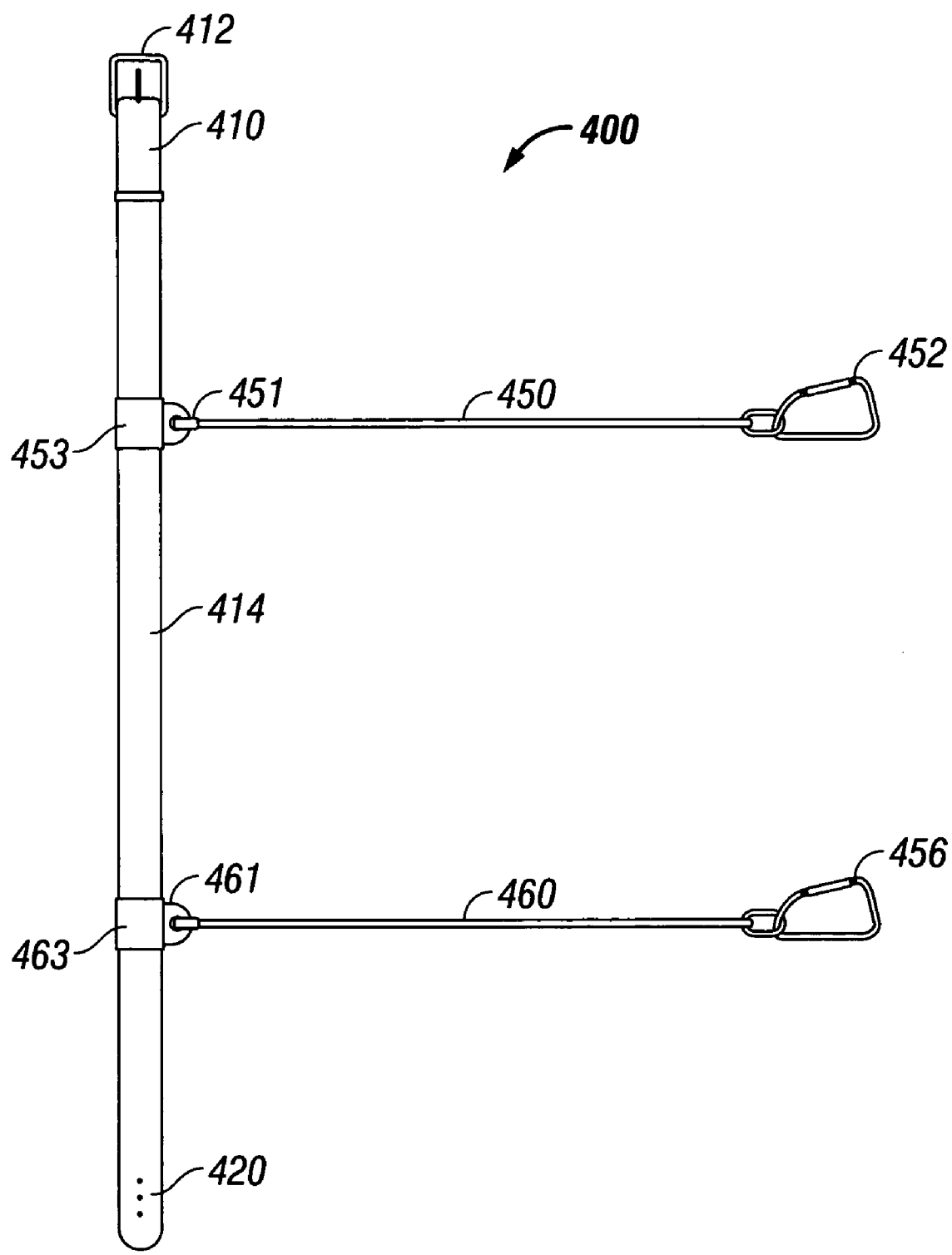
FIG. 8 illustrates a top plan view of an alternative waist belt according to the present invention used in cooperation with the improved seat assembly illustrated in FIG. 4.

Referring now to FIG. 8, these is illustrated an alternative waist belt 400 manufactured from leather, comprising a strap 414 and having the same dimensions as the belt 300 of FIG. 5, and including the two ends 410 and 420. The one end 410 has a belt buckle 412, through which the end 420 can pass to cinch up the belt. Instead of using the chains 350 and 360 as with the embodiment of FIG. 5, a pair of elongated cables 450 and 460 are used to connect the belt 400 to the rings 240 and 250 of the seat 200 illustrated in FIG. 4. The cables 450 and 460 can be manufactured from any strong materials, such as nylon, steel wire or other materials from which cables are commonly made. The cables 450 and 460 are each made long enough, for example, 18–20 inches, to allow the gunner to stand up, off the seat 200. The second end 451 of the cable 450 is connected to a loop 453 which can be moved by the gunner along the belt 414. The second end 461 of the cable 460 is likewise connected to a loop 463 which can be moved by the gunner along the belt 414. The preferred use of the invention contemplates the gunner positioning the loops 453 and 463 on opposing sides of his hips to allow the gunner ease of standing up off the seat 200.

Figure 9:
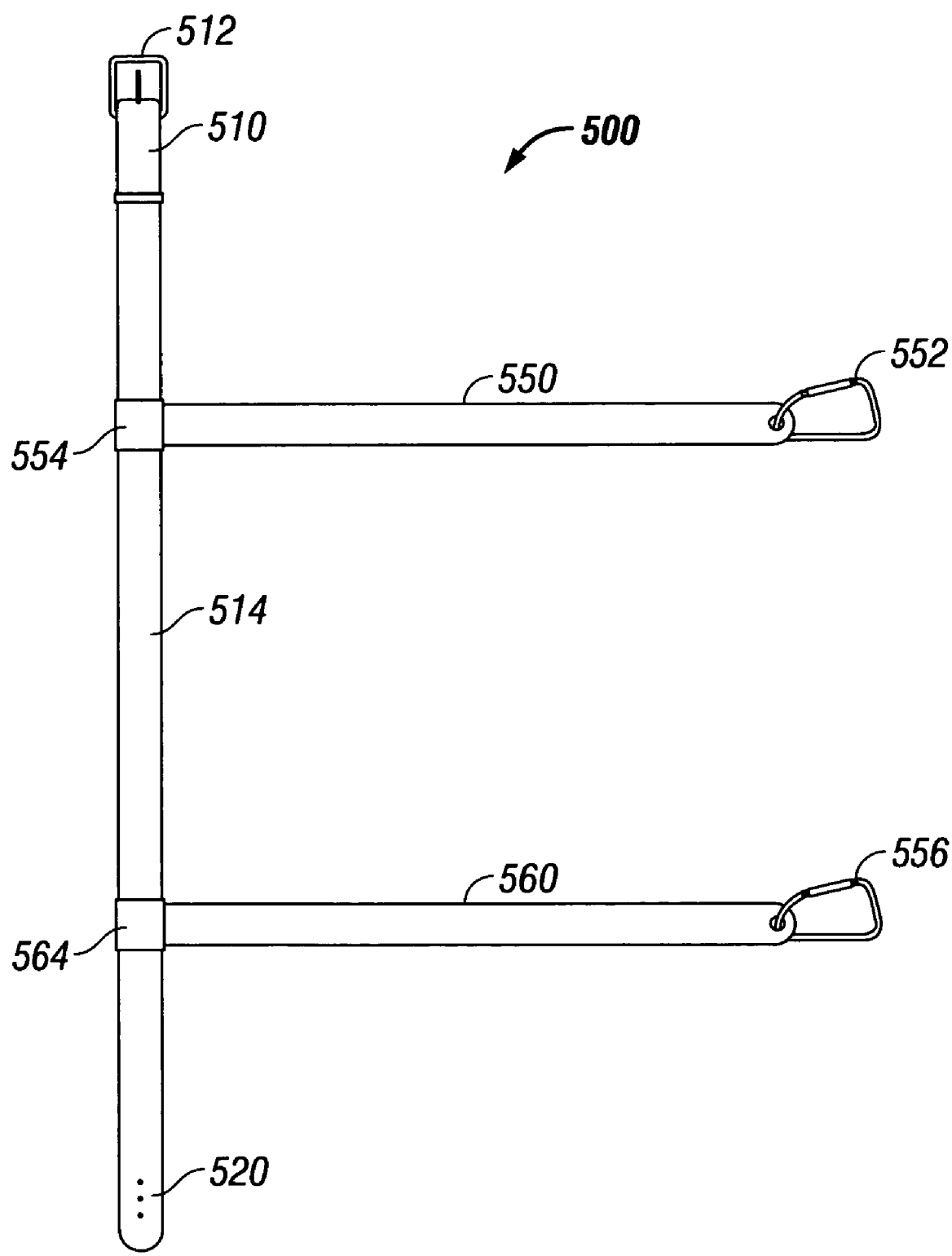
FIG. 9 illustrates a top plan view of yet another alternative waist belt according to the present invention used in cooperation with the improved seat assembly illustrated in FIG. 4.

Referring now to FIG. 9, these is illustrated an alternative waist belt 500 manufactured from leather, comprising a band 514 and having the same dimensions as the belt 300 of FIG. 5, and including the two ends 510 and 520. The one end 510 has a belt buckle 512, through which the end 520 can pass to cinch up the belt. Instead of using the chains 350 and 360 as with the embodiment of FIG. 5, a pair of elongated straps 550 and 560 are used to connect the belt 500 to the rings 240 and 250 of the seat 200 illustrated in FIG. 4, using a pair of quick disconnects 552 and 562, respectively, such as the quick disconnects illustrated in FIGS. 6 and 7. The straps 550 and 560 can be manufactured from any strong materials, such as leather, nylon, steel or other materials from which straps are commonly made. The straps 550 and 560 are each made long enough, for example, 18–20 inches, to allow the gunner to stand up, off the seat 200. The other ends of the straps 550 and 560 are sewn to a pair of loops 554 and 564, respectively, which can be positioned by the gunner as described above with respect to the loops 453 and 463 illustrated in FIG. 8.

Figure 10:
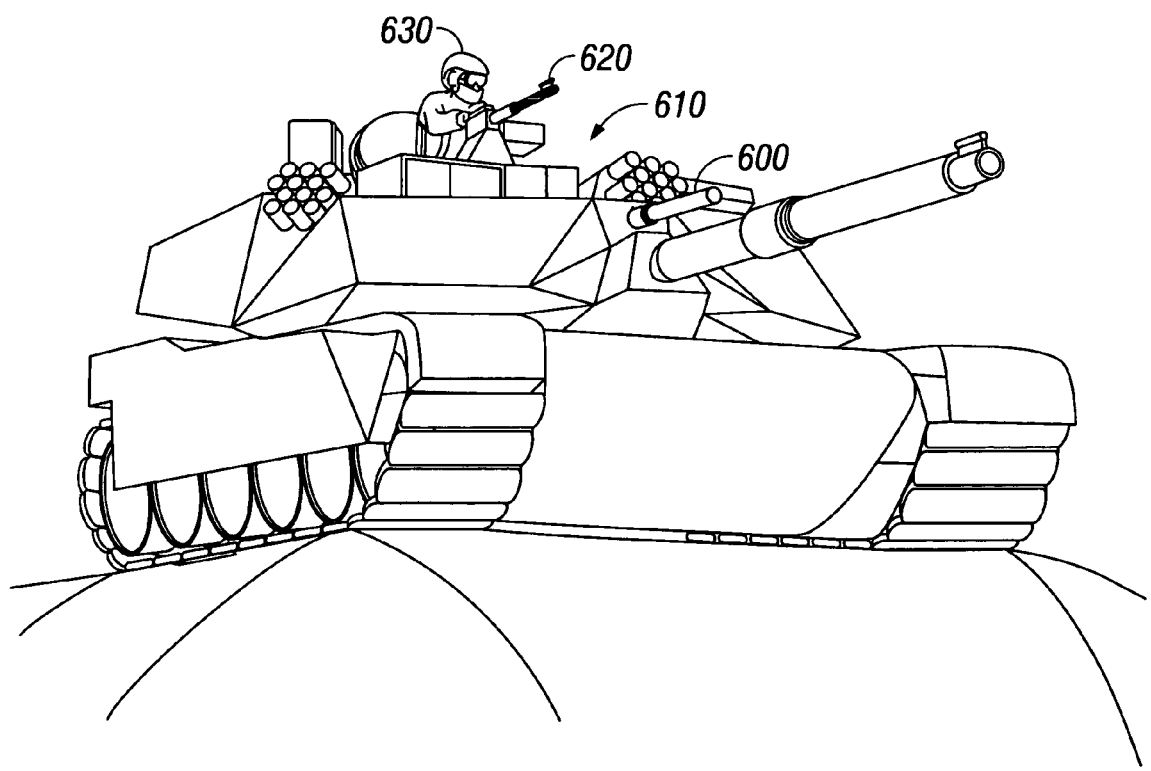
FIG. 10 illustrates a typical tank used by the United States Army and/or Marine Corps which can use the combination sling seat and waist belt assembly for use in a gun turret in accordance with the present invention.

Referring now to FIG. 10, illustrated is a military tank 600, comprising a rotating gun turret 610 and a machine gun 620 mounted on the turret. This rotating gun turret 610, manned by a single turret gunner 630, is very similar to the one used in the Humvee, illustrated in FIG. 2.

Figure 11:
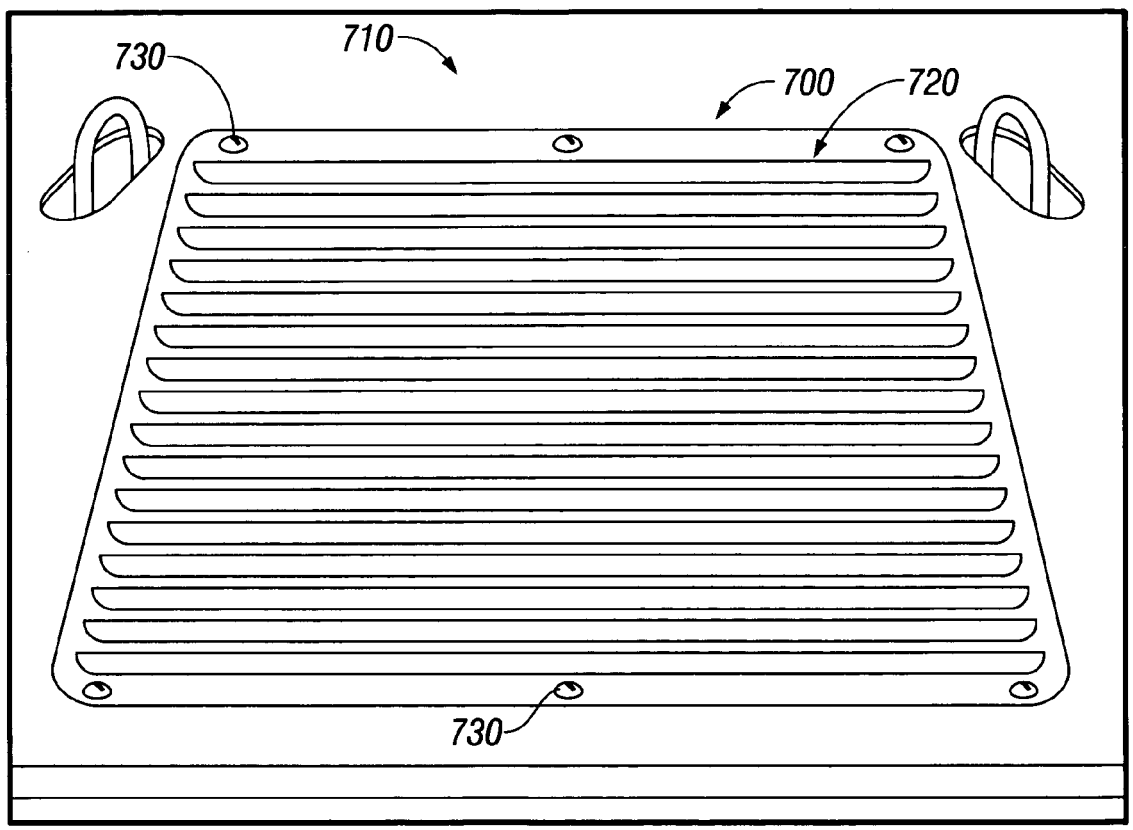
FIG. 11 illustrates an air receiving grill on the hood of an armored vehicle such as a Humvee for cooling the vehicle's engine with ambient air as the vehicle moves.
Figure 13:
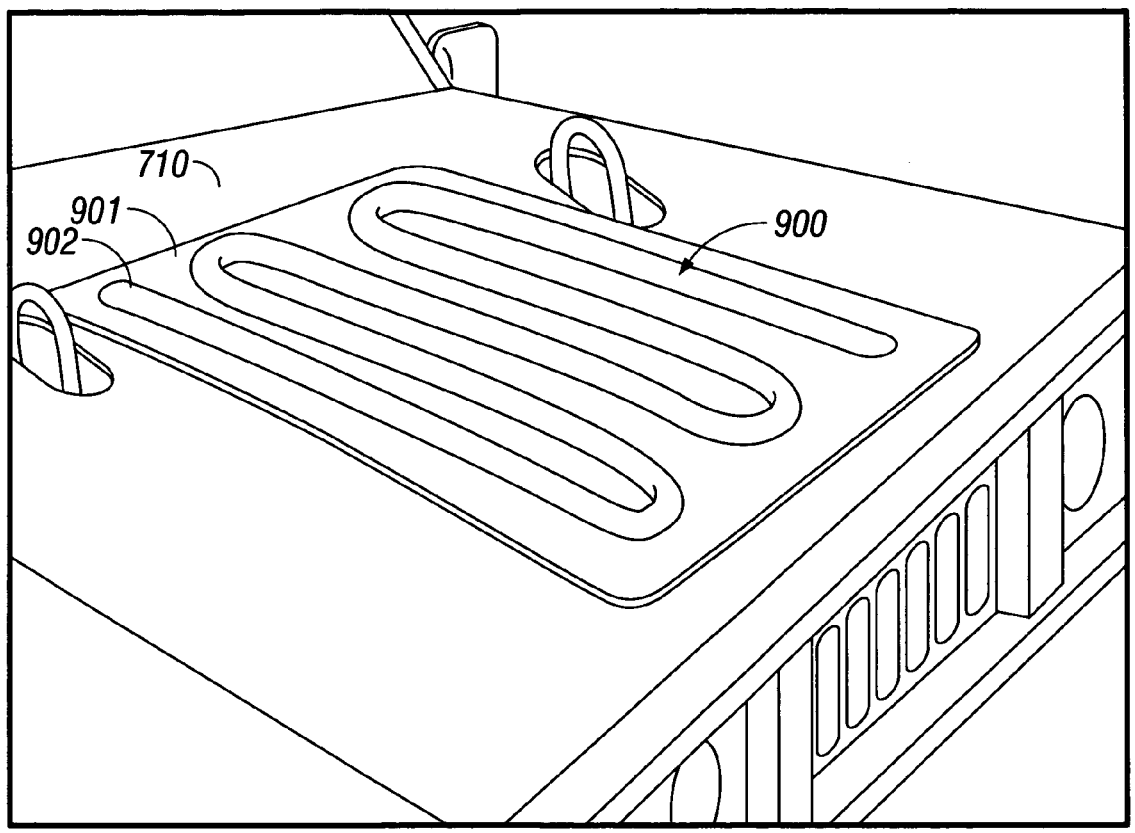
FIG. 13 illustrates a radiator under the hood of an armored vehicle such as a Humvee in which the air receiving grill shown in FIG. 11 is removed to display the radiator which lies below it.

FIG. 11 illustrates an air receiving grill 700 mounted on the hood of a Humvee 710. The air receiving grill 700 comprises several air vents, 720, through which ambient air may pass to cool the vehicle's radiator, located directly beneath the air receiving grill 700, in which the heat exchange members 902 (FIG. 13) lie in a plane substantially parallel to a second plane containing a longitudinal axis between the front and back ends of the vehicle. The location of the radiator 900 is illustrated in FIG. 13. The radiator 900 is shown in the opening 901 without the air receiving grill 700 connected to the hood of the Humvee 710. The air receiving grill 700 may be detachably connected to the hood of the Humvee 710 with conventional connectors such as the bolts 730 shown. The air receiving grill 700 may be made of any conventional metal used in the art for such armored vehicles and is attached to the hood of the armored vehicle 710 such that the air receiving grill 700 covers a hole in the hood 710 that is located directly above the vehicle's radiator and allows ambient air to flow to the radiator.

Figure 12:
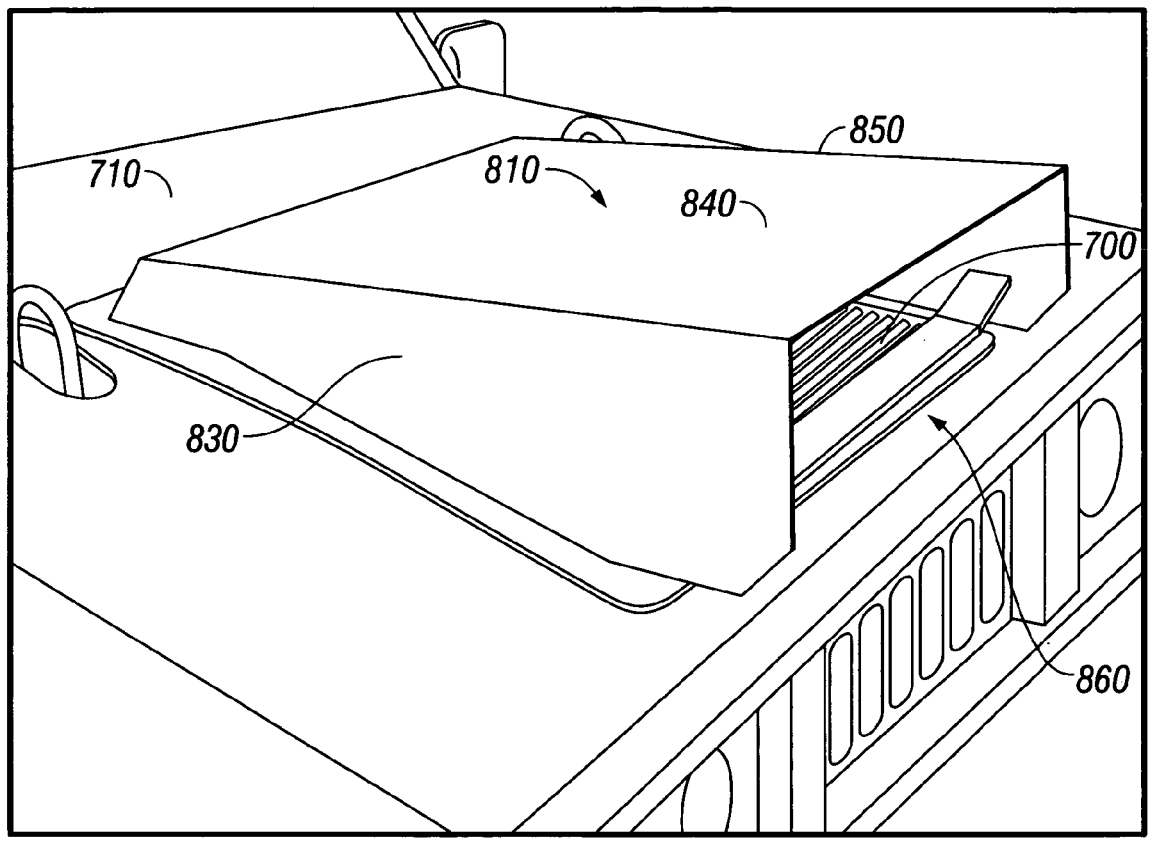
FIG. 12 illustrates an air receiving grill shown in FIG. 11 with an air scoop used in directing ambient cooling air to an armored vehicle's radiator as the vehicle moves.

Referring to FIG. 12, illustrated is an air receiving grill 700 with an air scoop 810 detachably connected to the hood of a Humvee 710. The air scoop 810 can be made of a thick sheet of any conventional metal used in the art for such armored vehicles and is shaped such that it has two sides 830 and 850 and a top 840, the two sides 830 and 850 being parallel to each other and perpendicular to the top of the air scoop 840. The air scoop 810 can be attached to the hood of the Humvee 820 with conventional connectors such as bolts such that the front opening 860 faces the direction of vehicle movement. As the armored vehicle moves forward, ambient air flows freely into the air scoop 810 and is directed though the air receiving grill 800 to cool the radiator.

Although the preferred embodiments contemplate the use of two tethers connecting the waist belt to the sling seat, the invention also contemplates the use of a single tether, or even three or more tethers. As an alternative to connecting the at least one tether to the sling seat, the tether can be connected from the body belt to one or more rings on or near the gun turret to prevent the gunner from being ejected in the event of a rollover of the vehicle. For example, the third ring can be placed on the floor at or beneath the gunner's feet.

Also, the invention contemplates the use of a restraining body belt other than, or in addition to, the waist belt which is described in the preferred embodiment. Thus, the body belt can be used to go across the chest, around the waist, over one or both shoulders, over or around one or both legs, over or around the gunner's helmet or any combination thereof, and still be tethered to the sling seat, as contemplated by the present invention.

Moreover, the individual tether or tethers can be shorter in length, if desired, while limiting the ability of the gunner to stand up, but maintaining the overall purpose of preventing the gunner from being ejected upon rollover of the vehicle.

The invention claimed is:

1. A combined sling seat and body belt assembly for use in a gun turret, comprising:
   a military vehicle having a gun turret, said vehicle having a rotatable turret ring;
   first and second rings spaced 180° apart on the inside surface of said turret ring;
   a third ring above, on or beneath said first and second rings spaced apart from said first and second rings;
   a sling seat having first and second ends, and first and second connections at said first and second ends, respectively, adapted to be connected to said first and second rings, respectively;
   a body belt being adapted to fit around a gunner's body; and
   at least one tether connected between said third ring and said body belt.

2. The military vehicle according to claim 1, wherein said vehicle is a Humvee.

3. The military vehicle according to claim 1, wherein said vehicle is a truck.

4. The military vehicle according to claim 1, wherein said vehicle is a tank.

* * * * *